(12) United States Patent
Lecourtier et al.

(10) Patent No.: US 8,704,404 B2
(45) Date of Patent: Apr. 22, 2014

(54) ELECTRICAL ASSEMBLY AND METHOD FOR SUPPLYING WITHOUT INTERRUPTION AN INSTALLATION WITH ALTERNATING CURRENT

(75) Inventors: George Lecourtier, Versailles (FR); Laurent Cargemel, Neauphle-le-Chateau (FR)

(73) Assignee: Bull SAS, Les Clayes-sous-Bois (FR)

( * ) Notice: Subject to any disclaimer, the term of this patent is extended or adjusted under 35 U.S.C. 154(b) by 362 days.

(21) Appl. No.: 13/038,405

(22) Filed: Mar. 2, 2011

(65) Prior Publication Data

US 2011/0215647 A1    Sep. 8, 2011

(30) Foreign Application Priority Data

Mar. 2, 2010   (FR) ...................................... 10 51512

(51) Int. Cl.
*H02J 7/00*     (2006.01)
*H02J 9/00*     (2006.01)

(52) U.S. Cl.
USPC .......................................................... 307/66

(58) Field of Classification Search
USPC ................................................ 307/64, 65, 66
See application file for complete search history.

(56) References Cited

U.S. PATENT DOCUMENTS

| | | | |
|---|---|---|---|
| 4,673,826 A | | 6/1987 | Masson |
| 5,612,580 A | | 3/1997 | Janonis et al. |
| 7,573,232 B2 * | | 8/2009 | Cheng et al. ............. 320/115 |
| 2001/0022472 A1 * | | 9/2001 | Codina et al. ............ 307/66 |
| 2005/0029984 A1 | | 2/2005 | Cheng et al. |
| 2005/0036253 A1 | | 2/2005 | Tian et al. |
| 2007/0152506 A1 * | | 7/2007 | Meyers et al. ............. 307/66 |
| 2007/0200432 A1 | | 8/2007 | Yano et al. |

FOREIGN PATENT DOCUMENTS

| | | |
|---|---|---|
| DE | 37 04 426 A1 | 11/1987 |
| DE | 3704426 A1 * | 11/1987 |
| DE | 102 44 608 A1 | 4/2004 |
| EP | 0 402 833 A2 | 12/1990 |

OTHER PUBLICATIONS

ABB SACE (Bus communication with ABB circuit-breakers).*
Sukumara, et al., "Fuel Cell Based Uninterrupted Power Sources," Power Electronics and Drive Systems, Proceedings, IEEE, 1997, pp. 728-733.

* cited by examiner

*Primary Examiner* — Stephen W Jackson
*Assistant Examiner* — Rasem Mourad
(74) *Attorney, Agent, or Firm* — Miles & Stockbridge P.C.

(57) ABSTRACT

An electrical assembly including an installation having an alternating current power supply port and at least one electrical system, and a device for supplying without interruption with alternating current the power supply port. The uninterruptible power supply device includes a first circuit for electrically connecting the power supply port to an alternating current power supply network, and a back up device including a rectifier, means for charging, storing and discharging electrical energy, and an inverter, connectable to the power supply port. The back up device is arranged in a second alternating current power supply circuit connectable to the power supply port in a by-pass of the first circuit. The uninterruptible power supply device includes a switch to connect selectively the first or the second circuit to the power supply port as a function of a state of the power supply of the electrical system in the installation.

8 Claims, 3 Drawing Sheets

ELECTRICAL ASSEMBLY AND METHOD FOR SUPPLYING WITHOUT INTERRUPTION AN INSTALLATION WITH ALTERNATING CURRENT

The present invention relates to a device for supplying without interruption an electricity consuming installation with alternating current. It also relates to an electrical assembly including such a device and the installation that it supplies with alternating current, as well as an uninterruptible alternating current supply method.

BACKGROUND OF THE INVENTION

More precisely, the invention relates to a power supply device connectable to an electrical power supply port of an installation, which moreover comprises at least one electrical system connected to the power supply port.

For example, it may apply to the power supply of an installation of computing center type including an information processing system, comprising at least one computer, needing to be supplied with direct current at extra-low voltage.

By "extra-low voltage" is understood a voltage generally considered as "safety voltage", which allows an operator to handle without danger any electrical component at said voltage. Such a voltage is moreover generally adapted to the electronic components of an information processing system. Several domains are legally defined in France and in Europe (ELV, SELV, PELV, FELV) but all place extra-low voltages below the threshold of 120 V with direct current and below the threshold of 50 V with alternating current.

The voltage of an alternating current distributed by an electricity distribution network is in general of the order of 220/230 V, which thus represents a priori danger for an operator. On the other hand, it is generally considered that a voltage of 50 V or less does not represent danger to handling. Thus, in telecommunications applications, the transmission data processing systems are generally subjected to a voltage of around 48 V. In aviation, the on-board components are generally subjected to a direct voltage of around 28 V. Finally, a computer type information processing system is generally subjected to a direct voltage of around 12 V.

An information processing system is for example a series of computer servers interconnected in a local network, thus forming a high performance computer, generally described as a HPC (High Performance Computing) computer. In this case, as in other sensitive applications (computer server, desktop or laptop micro-computer, telecommunications radiofrequency station, etc.), it is important that the operation of the electrical system is not disrupted by failures in the current power supply, particularly by micro-power cuts in the alternating current power supply network. Indeed, such failures, even when they only last several hundred milliseconds, can bring about computing errors, data losses or very penalizing malfunctions of the HPC computer.

By way of example, the micro-power cuts are quite frequent, since the administrator of the alternating current power supply network may, as the need arises, have to black out parts of the network. These have in general a duration equivalent to several periods of the alternating current: for alternating current of 50 Hertz, a micro-power cut from ten to twelve periods thus lasts between 200 and 250 milliseconds. Moreover, the restart up a device for converting an alternating current into direct current following a micro-power cut can itself also take 100 to 200 milliseconds, which gives a micro-power cut, seen from the electrical system consuming direct current, which can last up to 450 milliseconds.

Installations comprising an electrical system, for example an information processing system, of the type sensitive to micro-power cuts in the network, generally supply an uninterruptible power supply device, which makes it possible to supply a stable electrical supply and devoid of micro-power cuts, whatever happens in the alternating current power supply network. This uninterruptible power supply is generally connected directly to the alternating current power supply network and comprises as a result a rectifier for conversion of the alternating current into direct current (AC/DC converter function). It is moreover provided with an energy storage device, such as a battery of accumulators or a series of supercapacitors, and an inverter to convert the direct current generated by the energy storage device into an alternating current (DC/AC converter function). Inserted between the alternating current power supply network and an electrical power supply port of the installation, it then stands in for the power supply network to supply electrical energy to the electrical system during micro-power cuts or more serious failures of the network.

Such an uninterruptible power supply device is for example described in the article of Sukumara et al., entitled "Fuel cell based uninterrupted power sources", published in the 1997 International Conference on Power Electronics and Drive Systems Proceedings, vol. 2, pages 728-733, 26-29 May 1997. This device is placed in a cut-through configuration between the alternating current power supply network and the power supply port of the installation.

Thus, when this device is used for the direct current power supply at extra-low voltage of information processing systems of an installation, the alternating current supplied by the power supply network flows through the uninterruptible power supply device before supplying the installation. Consequently, it is firstly rectified for charging, if appropriate, accumulation batteries of the uninterruptible power supply device then inverted at the output of the uninterruptible power supply device. Finally, it is rectified again inside the installation. Knowing that each AC/DC or DC/AC conversion has in general an efficiency of 95%, such a cascade arrangement of converters has an efficiency of around 85%.

A known solution for reducing this degradation of the efficiency consists in replacing the aforementioned uninterruptible power supply device with double conversion by an uninterruptible power supply device with simple AC/DC conversion. The installation is then directly supplied with direct current and a double DC/AC then AC/DC conversion is thereby avoided. It can then be hoped to improve the efficiency by around 10%.

However this solution is not totally satisfactory because any installation needing to provide at least one circuit breaker, upstream of its power supply port and/or its electrical systems, it is then necessary to provide circuit breakers operating with direct current. At the interruption of current brought about by a circuit breaker in the event of a problem, an arc is created. With direct current, it is much more difficult to make this arc disappear than with alternating current: at 50 Hz, an arc disappears at the worst after 20 ms, whereas the same electric arc has no reason to disappear with direct current as long as the circuit breaker has not burned. Consequently, it is necessary to provide specific circuit breakers of more complex technology, which are then more bulky, more expensive and difficult to find commercially.

SUMMARY OF THE INVENTION

It may thus be desired to provide a device for supplying without interruption an electricity consuming installation which resolves at least part of the aforementioned problems and constraints.

An object of the invention is thus a device for supplying without interruption with alternating current an electrical power supply port of an installation comprising at least one electrical system connected to the power supply port, the uninterruptible power supply device comprising:

- a first circuit for electrically connecting the power supply port of the installation to an alternating current power supply network,
- a back up device, comprising a rectifier, means for charging, storing and discharging electrical energy and an inverter, connectable to the power supply port of the installation, characterized in that the back up device is arranged in a second alternating current power supply circuit connectable to the power supply port in a by-pass of the first circuit, and in that the uninterruptible power supply device comprises a switch arranged and commanded to connect selectively the first or the second circuit to the power supply port as a function of a state of the power supply of the electrical system in the installation.

Thus, in normal operation without particular malfunction and without necessity of charging the back up device, the current supplied by the network does not flow through the back up device and directly supplies the installation with alternating current for better efficiency. The presence of the switch commanded by the installation itself makes it possible to only solicit the back up device in case of necessity, either for a discharge of its storage means, for example in the event of a micro-power cut, or for a recharge of its storage means following a malfunction of the power supply. Finally, not only is the efficiency improved, but in addition the back up device is less solicited and thus wears out less quickly and the circuit breakers that need to be provided in the installation and/or upstream of its power supply port may be with alternating current.

In an optional manner, an uninterruptible power supply device according to the invention may moreover comprise a circuit breaker with alternating current arranged electrically at the output of the first and second circuits.

The invention also relates to an electrical assembly comprising:

- an installation comprising an alternating current power supply port and at least one electrical system consuming direct current electrically connected to the power supply port through a direct current power supply device with AC/DC conversion, and
- an uninterruptible power supply device as defined previously, electrically connected to the power supply port of the installation and wherein the switch is commanded to connect selectively the first or the second circuit to the power supply port as a function of a state of the direct current power supply of the electrical system in the installation.

In an optional manner, the installation moreover comprises at least one module for managing the power supply of the electrical system designed to transmit an information message on the state of the direct current power supply of the electrical system to a controller of the switch.

Also in an optional manner, the installation moreover comprises at least one additional back up device, comprising means for charging, storing and discharging electrical energy, electrically by-pass connected between the direct current power supply device and the electrical system supplied by said power supply device with direct current, the additional back up device being designed to transmit a warning signal in situation of discharge to the management module, this warning signal participating in the definition of the state of the direct current power supply of the electrical system in the installation.

Also in an optional manner, the management module is connected, by means of a numerical data transmission bus, to the direct current power supply device, to the additional back up device, to the electrical system and to the controller so as to receive and transmit information and/or command data from and to said direct current power supply device, said back up device, said electrical system and said controller.

Also in an optional manner, the electrical energy storage means of the additional back up device comprise at least one electrochemical double layer supercapacitor.

Also in an optional manner, the electrical energy storage means of the additional back up device comprise at least one circuit of supercapacitors arranged in series.

Also in an optional manner, the installation comprises a computing centre and the electrical system comprises an information processing system with at least one computer supplied with extra-low voltage of this computing centre.

The invention also relates to a method of supplying without interruption an electrical power supply port of an installation with alternating current comprising at least one electrical system connected to the power supply port, comprising the steps consisting in:

supplying the installation with alternating current by default by means of a first circuit for electrically connecting the power supply port to an alternating current power supply network, supplying the installation with alternating current by means of a back up device, comprising a rectifier, means for charging, storing and discharging electrical energy and an inverter, arranged electrically between the alternating current power supply network and the power supply port of the installation, in the event of malfunction of the power supply by default, characterized in that, the back up device being arranged in a second power supply circuit with alternating current connected to the power supply port in a by-pass of the first circuit, the method comprises a step of commutation between a power supply by the first or the second circuit as a function of a state of the power supply of the electrical system in the installation.

BRIEF DESCRIPTION OF THE DRAWINGS

The invention will be better understood on reading the description that follows, given uniquely by way of example and made in reference to the appended drawings, in which.

DETAILED DESCRIPTION

Figure 1:
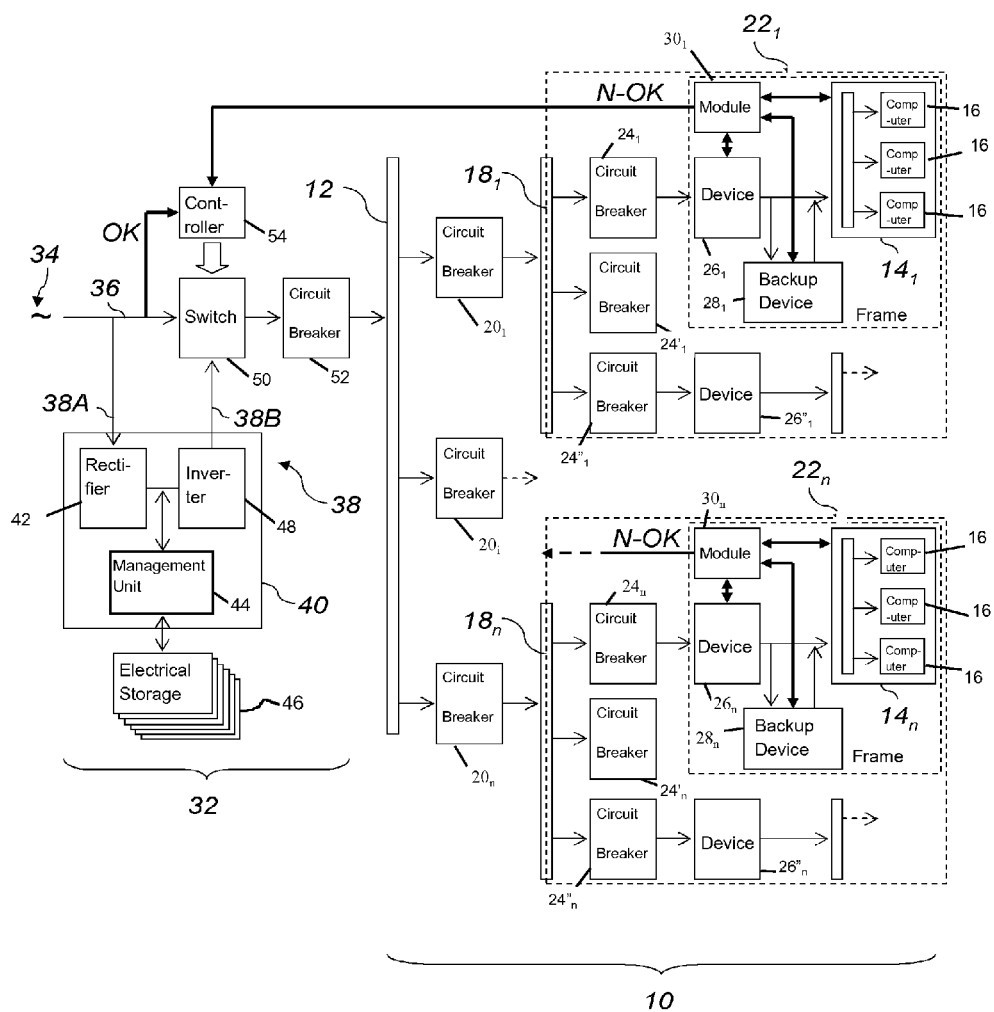
FIG. 1 schematically represents the general structure of an electrical assembly according to an embodiment of the invention.

The electrical assembly represented in FIG. 1 comprises an installation 10 of computing center type, comprising an alternating current power supply port 12 dimensioned to receive an alternating current at 230 V of a power of 1 MW. This input power of the installation 10 is given by way of purely illustrative example and it will appear obvious to those skilled in the art to adapt the teaching that is disclosed to them to other powers for other installation configurations, either by replacing or by duplicating the components concerned.

As computing center, for example a site accommodating a HPC computer, the installation 10 comprises several information processing systems $14_1, \ldots, 14_n$ such as servers, each with one or more computers 16. Each information processing system $14_1, \ldots, 14_n$ is an electrical system intended to be supplied with direct current at extra-low voltage.

In the installation 10, the information processing systems $14_1, \ldots, 14_n$ are electrically connected to the power supply port 12 through if appropriate several splitting levels of the electrical energy and several protection levels based on circuit breakers.

At a first splitting level illustrated in FIG. 1, the alternating electric current at 230 V of a power of 1 MW that flows through the power supply port 12 is distributed to several sections (for example cabinets of servers) $18_1, \ldots, 18_n$. Each of these cabinets $18_1, \ldots, 18_n$ receives for example a hundred or so kW of alternating current at 230 V and is electrically connected to the power supply port 12 through a circuit breaker $20_1, \ldots, 20_n$.

At a second splitting level illustrated in FIG. 1, the alternating electric current at 230 V of a power of a hundred or so kW that flows through the cabinet $18_1$ is distributed to several sub sections (for example frames of servers), a single one of which is represented ($22_1$) for reasons of clarity. The frame $22_1$, like any other frames of the cabinet $18_1$, receives for example ten or so kW of alternating current at 230 V and is electrically connected to the cabinet $18_1$ through a circuit breaker $24_1$.

The frame $22_1$ comprises a direct current power supply device $26_1$ with AC/DC conversion, the information processing system $14_1$ intended to be supplied with direct current at extra-low voltage by the device $26_1$, a back up device $28_1$ which can be activated in the event of failure of the direct current power supply in the frame $22_1$ and a module $30_1$ for managing the power supply of the information processing system $14_1$. The frame $22_1$ will be detailed with reference to FIG. 2.

The information processing system $14_1$ is thus electrically connected to the power supply port 12 through the direct current power supply device $26_1$, but also circuit breakers $20_1$ and $24_1$.

The cabinet $18_1$ may comprise other sub sections, frames and/or other splitting levels, electrically connected to the cabinet $18_1$ through circuit breakers (for example the circuit breakers $24'_1, 24''_1$ illustrated in FIG. 1) and/or direct current power supply devices with AC/DC conversion (for example the converter $26''_1$ illustrated in FIG. 1).

In the same way, the other cabinets of the installation 10 of FIG. 1 may comprise sub sections according to different possible architectures. The cabinet $18_n$, also detailed as the cabinet $18_1$, thus comprises several components bearing the same references as those of the cabinet $18_1$, with the exception of the index "1" which is replaced by the index "n".

The electrical assembly represented in FIG. 1 moreover comprises a device 32 for the supply without interruption of the power supply port 12 of the installation 10 with alternating current. Said uninterruptible power supply device 32 is electrically connected, on the one hand, to a network 34 for distributing alternating current at 50 Hz at a voltage of 230 V and, on the other hand, to the power supply port 12. It comprises:

a first circuit 36 for electrically connecting the power supply port 12 of the installation 10 to the network 34, and a second back up alternating current supply circuit 38 connectable to the power supply port 12 in a by-pass of the first circuit 36.

More precisely, the second circuit 38 comprises a general back up device 40 itself comprising a rectifier 42, a management unit 44 for charging and discharging electrical energy in storage means 46 of battery or other type and an inverter 48. It is directly connected to the first circuit 36 or to the network 34 by means of an equipotential electrical connection 38A for the alternating current power supply of the rectifier 42 when the storage means 46 are to be charged and again to the first circuit 36 by means of an equipotential electrical connection 38B through a switch 50 for the power supply with alternating current of the power supply port 12 by the general back up device 40 when the storage means 46 are to be discharged. Thus, in the example illustrated, the second circuit 38 is constituted of the equipotential electrical connection 38A, the general back up device 40, the storage means 46 and the equipotential electrical connection 38B.

The switch 50 is thus arranged to connect selectively the first 36 or the second circuit 38 to the power supply port 12 of the installation 10. For the sake of general protection of the installation 10, a general circuit breaker 52 with alternating current is moreover arranged in a cut-through configuration between the switch 50 and the power supply port 12, i.e. at the output of the first and second circuits 36, 38.

Moreover, the switch 50 is commanded by a controller 54 that is designed to make the selection of the first or the second circuit as a function of information messages that it receives on a state of the power supply of the information processing systems $14_1, \ldots, 14_n$ of the installation 10.

To this end, the controller 54 is connected, for example by means of a numerical data transmission bus, to the management modules $30_1, \ldots, 30_n$ of the information processing systems $14_1, \ldots, 14_n$. It can also be connected by said bus to a component of the first circuit 36. The data transmission bus is not directly illustrated in FIG. 1 but is functionally represented by two arrows in bold characters symbolizing the reception of data by the controller 54 from the management modules $30_1, \ldots, 30_n$ and the aforementioned component of the first circuit 36. It may be any data transmission bus adapted to the context of the illustrated application: for example a RS485, CAN, Ethernet, RS232 bus or other.

The information messages likely to be taken into account by the controller 54 comprise for example N-OK warning messages on the direct current power supply of the information processing systems $14_1, \ldots, 14_n$ from the management modules $30_1, \ldots, 30_n$ and OK messages for restart of service from the first circuit 36.

In practice, the controller 54 may be of software or hardware type and, if it is of hardware type, may comprise a dedicated "hardware" type equipment or programmed chip. An example of its operation will be detailed with reference to FIG. 3.

Figure 2:
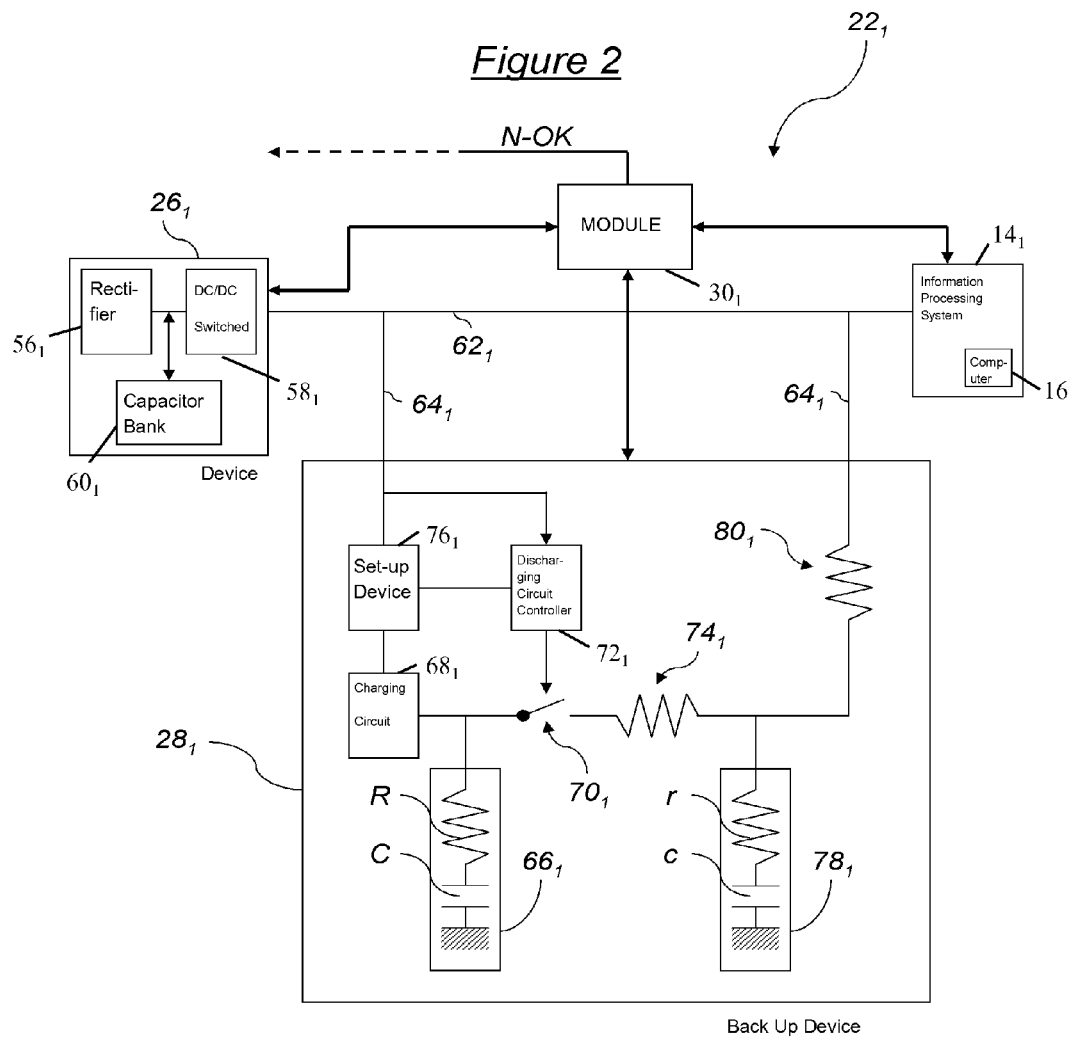
FIG. 2 represents a detail of the electrical assembly of FIG. 1.

The frame $22_1$ detailed in FIG. 2 comprises the information processing system $14_1$ intended to be supplied with direct current, at an intensity that it imposes as a function of its consumption at each instant and at a substantially constant predetermined voltage. Purely by way of illustration, the information processing system $14_1$ is for example designed to be supplied with direct current of 700 A at a substantially constant voltage of 12 V.

By "substantially constant" is understood a direct voltage, the variations of which are sufficiently low around its reference value (as it happens 12 V in the application considered) so that the information processing system $14_1$ can withstand them without damaging its information processing components. Given that information processing systems, for example of computer type, are provided with an internal conversion stage which regulates the current that they consume as a function of the voltage that they use to supply a very regular voltage that can drop down to less than 1 V, variations of 10 to 15% around the reference value of the direct voltage known as substantially constant supplied at the input of these systems are acceptable. Thus for example, it is acceptable to consider that a substantially constant direct voltage of 12 V can vary between 11 and 13 V. Such a substantially constant voltage is for example obtained by regulation of the direct voltage supplied to the information processing system $14_1$ by means of a reference maximum voltage threshold and a minimum voltage threshold.

To ensure this power supply, the frame $22_1$ thus comprises the direct current power supply device $26_1$ with AC/DC conversion transforming the alternating current at 50 Hz at a voltage of 230 V into a direct current delivered at a voltage of 12 V. This direct current power supply device $26_1$ comprises in a conventional manner a rectifier associated with a switched mode power supply $56_1$, which supplies, from the current at 50 Hz at 230 V, a direct current at 400 V to a second DC/DC switched mode power supply $58_1$, the functions of which are to isolate the input from the output of the device $26_1$ by means of a transformer and to convert the direct current at 400 V into direct current at 12 V. In a by-pass of the circuit that connects the rectifier $56_1$ to the second DC/DC switched mode power supply $58_1$, the device $26_1$ comprises a capacitor or series of capacitors, known as "hold up" capacitor bank $60_1$, capable a priori of withstanding for several tens of milliseconds, for example around 20 ms, a power supply interruption. This "hold up" capacitor bank $60_1$ stores the peak value of the electrical signal rectified to 400 V.

The information processing system $14_1$, more particularly its direct current power supply, is connected to the direct current power supply device $26_1$ by means of a first power supply circuit $62_1$ which will be named in the remainder of the description "first frame circuit $62_1$" so as not to be confused with the first general power supply circuit 36.

A second by-pass circuit $64_1$ of part of the direct current supplied by the direct current power supply device $26_1$ is arranged in the frame $22_1$ parallel to the first frame circuit $62_1$ between the device $26_1$ and the information processing system $14_1$. This second by-pass circuit $64_1$ will be named in the remainder of the description "second frame circuit $64_1$" so as not to be confused with the second general by-pass circuit 38.

This second frame circuit $64_1$ comprises the back up device $28_1$ of the frame $22_1$. It thus enables the back up device $28_1$ to draw part of the direct current delivered for the information processing system $14_1$ by the direct current power supply device $26_1$ in order to store electrical energy, and to supply, in the event of failure of the current power supply in the first frame circuit $62_1$, direct current, drawn from the stored electrical energy, to the information processing system $14_1$. In other words, the back up device $28_1$ is designed to take over from the power supply device $26_1$ in the event of failure in the frame $22_1$.

The back up device $28_1$ comprises electrical energy storage means $66_1$. These storage means $66_1$ may comprise one or more conventional batteries. Batteries of accumulators generally have a good energy stored per unit of volume ratio. On the other hand, they have a poor emitted peak power per unit of volume ratio, which makes them not very advantageous for applications where the information processing system $14_1$ consumes a direct current of high intensity. This is particularly the case when the information processing system $14_1$ is a HPC computer since a direct current of 700 A may be necessary. In this case, the electrical energy storage means $66_1$ comprise advantageously at least one supercapacitor, preferably at least one circuit of supercapacitors arranged in series, the emitted peak power per unit of volume ratio of which is considerably higher. This peak power cannot however be emitted for too long a period, but this is easily sufficient to compensate for the failures, particularly the micropower cuts of an alternating current power supply network of good quality, these generally do not exceed several hundreds of milliseconds.

The supercapacitors are generally of EDLC (Electrochemical Double Layer Capacitor) type, in other words designed according to the electrochemical double layer method. They have an internal resistance considerably less than that of batteries. The electrical energy storage means $66_1$ with supercapacitors may be modeled by an RC series type circuit (i.e. circuit comprising a resistor and a capacitor in series), connected on the one hand to earth and on the other hand to the second frame circuit $64_1$, of resistance R and capacitance C.

The back up device $28_1$ moreover comprises means $68_1$ for charging the electrical energy storage means $66_1$ from part of the direct current supplied by the device $26_1$ for supplying with direct current to the power supply of the information processing system $14_1$. These charging means $68_1$ are constituted of a conventional charger of supercapacitors and will thus not be detailed. They make it possible to charge the electrical energy storage means $66_1$ in several minutes, in general not more than three minutes, thus not disturbing too much the operation of the information processing system $14_1$.

The power supply back up device $28_1$ also comprises means $70_1$, $72_1$ of discharging the energy stored in the electrical energy storage means $66_1$ to the power supply of the information processing system $14_1$, at a given intensity (imposed by the information processing system $14_1$) and a substantially constant predetermined voltage, following the detection of a failure (voltage drop below an acceptable threshold) in the first frame circuit $62_1$.

These discharge means comprise a switch $70_1$ commanded by a controller $72_1$. The switch $70_1$ comprises for example at least one pair of field effect N-MOS transistors arranged head to tail in series. This arrangement by pair makes it possible to isolate the supercapacitors from the electrical energy storage means $66_1$ of the information processing system $14_1$, whatever the voltage at the terminals of the supercapacitors and the information processing system $14_1$. Moreover, if at the moment of discharge the current intended to flow through the switch $70_1$ is greater than that which such a pair of transistors can withstand, several pairs of transistors arranged in parallel, commanded by the same controller $72_1$, may be provided to form the switch $70_1$.

The switch $70_1$ is illustrated in FIG. 2 by an ideal on off switch with which is associated an internal resistance $74_1$. The controller $72_1$ is, for its part, designed to be able to detect a direct current power supply failure as soon as the value of the voltage supplied to the information processing system $14_1$ drops below a predetermined threshold voltage.

As indicated previously, the direct current of 700 A supplied by the direct current power supply device $26_1$ to the power supply of the information processing system $14_1$ has for example a voltage of 12 V in the first frame circuit $62_1$. The current withdrawn by the second frame circuit $64_1$ thus has a priori said same voltage of 12 V. However, in order that in the event of failure the electrical energy storage means $66_1$ can supply a direct current to the information processing system $14_1$ at this same voltage of 12 Volts, it is necessary that they are charged to a higher voltage, particularly on account of the internal resistance of the electrical energy storage means $66_1$ and of that of the switch $70_1$. For example, this necessary higher voltage may be close to 15 Volts. Moreover, due to the fact that the switch $70_1$ is composed of field effect MOS transistors, the gate of which has to be supplied, the controller $72_1$ has to provide in general a voltage greater than 20 Volts.

For these reasons, a voltage step up device $76_1$ of conventional type is provided upstream of the charger $68_1$ and the controller $72_1$ in the second frame circuit $64_1$, to step up the voltage from 12 V to 21 V for example. According to another variant, two different voltage step up devices could be envisaged, one for the charger $68_1$, the other for the controller $72_1$, since the voltages that they require are not the same.

The back up device $28_1$ operates in the following manner:
when the information processing system $14_1$ is supplied with direct current by the direct current power supply device $26_1$, part of this current is by-passed by the second frame circuit $64_1$ for charging the electrical energy storage means $66_1$, as long as they are not yet completely charged, when a failure is detected by the controller $72_1$, this controls the closing of the switch $70_1$ so that the electrical energy storage means $66_1$ take over from the first malfunctioning frame circuit $62_1$.

The time taken by the switch $70_1$ to close and allow the current to flow from the electrical energy storage means $66_1$ may however be sufficient to disrupt the operation of the information processing system $14_1$. The back up device $28_1$ thus advantageously comprises additional electrical energy storage means $78_1$, for example constituted of simple capacitors, known as smoothing capacitors, arranged in parallel at the output of the switch $70_1$. The additional electrical energy storage means $78_1$ may, like the storage means $66_1$ with supercapacitors, be modeled by an RC series type circuit, connected on the one hand to earth and on the other hand to the second frame circuit $64_1$ at the output of the switch $70_1$, of resistance r and of capacitance c. By way of non limiting example, twenty or so smoothing capacitors may be arranged at the output of the switch $70_1$, for a resistance r of 0.5 m$\Omega$ and a capacity c of 0.01 F.

Thanks to these additional electrical energy storage means $78_1$, the power supply back up device $28_1$ operates more precisely in the following manner:
when the information processing system $14_1$ is supplied with direct current by the direct current power supply device $26_1$, part of this current is by-passed for a limited time by the second frame circuit $64_1$ for charging the electrical energy storage means $66_1$, as long as they are not yet completely charged, a small part of this current is also diverted for a limited time for charging the additional electrical energy storage means $78_1$ as long as they are not yet completely charged, when a failure is detected by the controller $72_1$, this controls the closing of the switch $70_1$, between the start of the failure and the actual closing of the switch $70_1$, part of the electrical energy accumulated in the additional energy storage means $78_1$ is transmitted to the information processing system $14_1$, and when the switch $70_1$ is effectively closed, the electrical energy storage means $66_1$ take over from the first malfunctioning frame circuit $62_1$.

It will be understood that it is not useful to provide supercapacitors in the additional electrical energy storage means $78_1$ since they are only intended to supply their stored energy for a very short transition time of the order of several microseconds, considerably shorter than the duration of the failure.

In concrete terms, the back up device $28_1$, with its charger $68_1$, its controller $72_1$, its voltage step up device $76_1$, its switch $70_1$, and its storage means $66_1$ and $78_1$, is fitted on a card forming support and having an internal resistance $80_1$ equal for example to 0.1 m$\Omega$.

Whereas the information processing system $14_1$ is supplied by the device $26_1$ with direct current of 12 V from an alternating current at 230 V via the first frame circuit $62_1$, the second frame circuit $64_1$ is itself also connected to the first frame circuit $62_1$ so that it enables charging of the back up device $28_1$ by means of this direct current of 12 V. This charging takes place by a consumption of direct current generally between 0.5 and 18 A. The second frame circuit $64_1$ also enables the controller $72_1$ to withdraw the value of the voltage of the direct current supplied by the first frame circuit $62_1$ so as to be able to detect any failure, by the appearance of a voltage drop.

The voltage step up device $76_1$, for example a DC/DC chopping converter, steps up the voltage of the direct current supplied by the second frame circuit $64_1$ into a direct current at 21 V of intensity between 0 and 9 A, depending on whether the back up device $28_1$ is in a situation of charge or not. This current supplies the controller $72_1$ and the charger $68_1$.

The charger $68_1$ supplies in its turn to the electrical energy storage means $66_1$ a direct current, the intensity of which varies between 0 and 12 A depending on whether the back up device $28_1$ is in a situation of charge or not.

It is advisable to dimension the electrical energy storage means $66_1$ so that in situation of discharge they can supply a current of 700 A for, for example, at the most 480 ms at a voltage of around 12 V always at least greater than a predetermined limit for example set at 11 V.

In a concrete manner, the electrical energy storage means $66_1$ comprise at least one circuit of six supercapacitors arranged in series. For acceptable dimensions, it is possible to find supercapacitors, the characteristics of which are as follows: a capacitance equal to 600 F, an internal resistance equal to 0.83 m$\Omega$ and a maximum potential difference withstood at the terminals of the supercapacitor of 2.7 V. Thus, a circuit of six supercapacitors arranged in series has an equivalent capacitance C=100 F and an equivalent internal resistance R=4.98 m$\Omega$. It can be shown that the evolution after a time T of the voltage delivered by such a circuit during the discharge of its supercapacitors bears out the following equation:

$$V=(V_0-IT/C)-RI, \qquad (1)$$

where $V_0$ is the charge voltage that the charger $68_1$ has to deliver, I=700 A the current delivered by the circuit, T=480 ms the maximum discharge time.

It may be seen that, under these conditions, in order that the voltage V delivered by the circuit is always greater than 11 V, it is necessary that the charge voltage $V_0$ is at least 17.85 V. However, the maximum potential difference withstood at the terminals of the six capacitors cited above is 6×2.7 V=16.2 V. It is thus apparent that a single circuit of six capacitors is not sufficient.

By providing two circuits of six capacitors such as those cited above, arranged in parallel, electrical energy storage means $66_1$ are conceived, the equivalent capacitance C of which is equal to 200 F and the equivalent internal resistance R is equal to 2.49 m$\Omega$. Under these new conditions, in order that the voltage V of the current delivered by the electrical energy storage means $66_1$ is always greater than 11 V, it is necessary that the charge voltage $V_0$ is at least 14.42 V. In practice, the voltage drop at the terminals of the switch $70_1$ imposes a slightly higher supply voltage, for example equal to $V_0 = 14.8$ V. By taking into account moreover the internal resistance of the electrical energy storage means $66_1$, it is thus possible for the second frame circuit $64_1$ to deliver a current of 700 A at a substantially constant voltage, in other words always between 11 and 13 V, in situation of discharge of the back up device $28_1$, for a maximum duration of 480 ms. It will also be noted that electrical energy storage means $66_1$ having these parameters of equivalent resistance and capacitance by means of supercapacitors may be charged in less than three minutes by the charger $68_1$.

The possible or even desirable duplication of the circuit of six supercapacitors in the electrical energy storage means $66_1$ has just been detailed. It is also possible, for practical reasons, to duplicate the voltage step up device $76_1$, the charger $68_1$, the controller $72_1$ and the switch $70_1$.

The module $30_1$ for managing the power supply of the information processing system $14_1$ of the frame $22_1$ is connected, for example by means of a numerical data transmission bus, to the power supply device $26_1$, to the information processing system $14_1$ and to the back up device $28_1$ so as to receive and transmit information and/or command data from and to said power supply device $26_1$, said information processing system $14_1$ and said back up device $28_1$. The data transmission bus is not directly illustrated in FIG. 2 but is functionally represented by the double arrows in bold characters symbolizing the data exchanges from and to the management module $30_1$. It may be any data transmission bus adapted to the context of the illustrated application: for example an I²C (developed by Philips), SPI (developed by Motorola), JTag (normalized by IEEE) bus or other.

In practice, the management module $30_1$ may be of software or hardware type and, if it is of hardware type may comprise a dedicated "hardware" type equipment or programmed chip. It may be integrated into the information processing system $14_1$, particularly integrated into a HPC control server when the system $14_1$ is a HPC computer.

It is suited to receiving failure warnings from the power supply device $26_1$, from the back up device $28_1$ when the latter has itself automatically detected said failure, or as a last resort from the information processing system $14_1$. It is also suited to receiving a start up information of the discharge of the back up device $28_1$ if said device is suited to discharging itself automatically when a failure occurs. This start up information that the back up device $28_1$ is designed to emit when it discharges is processed by the management module $30_1$ as a warning signal on the state of the direct current power supply of the information processing system $14_1$.

The management module $30_1$ is thus more precisely programmed to:
  receive warning signals on the state of the direct current power supply of the information processing system $14_1$,
  transmit a start up command of the back up device $28_1$ if the latter is not suited to discharging itself automatically when a failure occurs,
  transmit to the controller 54 a N-OK warning message in the event of detection of a failure following the reception of at least one warning signal, and
  as a last resort, transmit a shut down command of the information processing system 10.

The above detailed description of components of the frame $22_1$ also applies for the components of other frames $22_2, \ldots, 22_n$.

Figure 3:
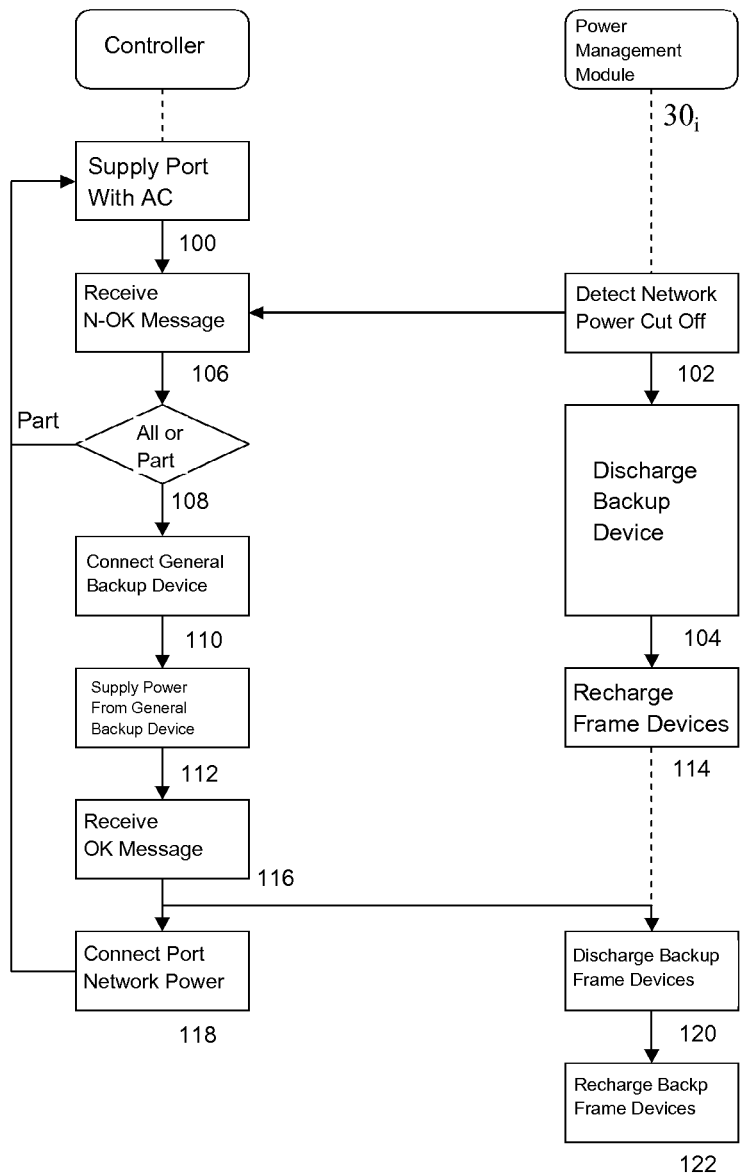
FIG. 3 illustrates the successive steps of an uninterruptible supply method according to an embodiment of the invention.

A method of supplying without interruption the power supply port 12 with alternating current, particularly an operation of the controller 54 in coordination with the management modules $30_1, \ldots, 30_n$, will now be detailed with reference to FIG. 3.

During a first step 100 of operation without particular event, the switch 50 is commanded by the controller 54 to supply directly by default the power supply port 12 of the installation 10 with alternating current supplied by the network 34 via the first power supply circuit 36. During this step, the general back up device 40 and the frame back up devices $28_1, \ldots, 28_n$ are assumed to be completely charged. Moreover, the information processing systems $14_1, \ldots, 14_n$ are assumed to operate at full consumption, i.e. at 1 MW.

When a power supply incident occurs in at least one of the frames $22_1, \ldots, 22_n$, if said incident is of duration less than the discharge time of the "hold up" capacitor bank of any of the direct current power supply devices $26_1, \ldots, 26_n$ (for example 20 ms), then nothing happens, except for the transmission, if appropriate, of an incident notification by the concerned power supply device $26_i$ to its management module $30_i$.

If the incident is of duration greater than said discharge time, then a voltage drop becomes perceptible in at least one of the first frame circuits $62_1, \ldots, 62_n$.

The incident may be due to a problem of power cut in the network 34 or to another supply problem at any spot in the installation 10. In all cases, it propagates to all of the first frame circuits $62_1, \ldots, 62_n$ situated downstream of the origin of said incident. It is thus detected by at least one management module $30_i$ during a step 102. This management module $30_i$ then transmits to the controller 54 a N-OK warning message. During this same step 102, the incident triggers a discharge 104 of the corresponding back up device $28_i$.

During a step 106, the controller 54 receives at least one N-OK warning message from at least one management module $30_i$. Then, during the discharge 104 and during a test step 108, the controller 54 determines if the incident concerns only part or all of the frame $22_1, \ldots, 22_n$.

If the incident only concerns part of the frame, then the incident is considered as internal to the installation 10 and the controller 54 returns to step 100. If not, the incident is considered as having as origin a power cut of the network 34 and one passes to step 110, still during the discharge 104, during which the controller 54 controls the switch 50 so that the latter connects the general back up device 40 (thus the second circuit 38) to the power supply port 12 so as to start a discharge of the general back up device 40.

In a variant, the controller 54 can wait a certain time before triggering the step 110, with the aim of not starting the general back up device 40 if the incident is only a micro-power cut of the network 34 manageable by the back up frame devices $28_1, \ldots, 28_n$. This waiting time must be neither too short to be able to include a micro-power cut (of the order of several hundreds of milliseconds) or too long to ensure that the start up of the general back up device 40 can take place during the discharge of the back up frame devices $28_1, \ldots, 28_n$.

The discharge 104 lasts sufficiently long to enable a commutation and a start up 110 without voltage drop of the general back up device 40.

As long as the network 34 is malfunctioning, the installation 10 is supplied by the general back up device 40 during a step 112. In particular, back up frame devices $28_1, \ldots, 28_n$ and/or the "hold up" capacitor banks if appropriate discharged may charge themselves during this back up power supply phase 112, which does not pose a problem since this recharging, referenced by step 114, only takes several seconds, 20 s at the most.

During a step 116, the controller 54 receives an OK message from a component of the first power supply circuit 36 indicating to it the re-establishment of the network 34.

One then passes to a step 118 during which the controller 54 controls the switch 50 so that the latter returns to a position of direct connection of the power supply port 12 to the network 34 via the first circuit 36. As for step 110, a discharge 120 of the back up frame devices $28_1, \ldots, 28_n$ may be commanded during the execution of step 118 as long as the power supply by the network 34 is not completely operational.

Following step 118, one returns to step 100. Moreover, following the discharge 120, a recharge 122 of the back up frame devices $28_1, \ldots, 28_n$ and/or the "hold up" capacitor banks that may be discharged takes place automatically.

It is clearly apparent that a device and uninterruptible supply method such as those described previously make it possible to only solicit the general back up device 40 in case of necessity and without taking any risk for the installation 10. The lifetime of the general back up device 40 is thus extended, which is economically very advantageous since this kind of device is generally very costly.

It will be noted moreover that the invention is not limited to the embodiment described previously. It will become clear, in fact, to those skilled in the art that various modifications may be made to the embodiment described above, in light of the teaching that has just been disclosed to them. In the claims that follow, the terms used should not be interpreted as limiting the claims to the embodiment described in the present description, but should be interpreted to include therein all the equivalents that the claims aim to cover on account of their formulation and the provision of which is within the reach of those skilled in the art by applying their general knowledge to the implementation of the teaching that has just been disclosed to them.

The invention claimed is:

1. An electrical assembly comprising an installation comprising an alternating current power supply port and at least one electrical system, and an uninterruptible power supply device for supplying without interruption with alternating current the power supply port, the uninterruptible power supply device comprising:
    a first circuit for electrically connecting the alternating current power supply port of the installation to an alternating current power supply network; and
    a back up device comprising a rectifier, means for charging, means for storing and means for electrical energy, and an inverter connectable to the alternating current power supply port of the installation,
    wherein the back up device is arranged in a second alternating current supply circuit connectable to the alternating current power supply port in a by-pass of the first circuit,
    wherein the uninterruptible power supply device comprises a switch arranged and commanded to connect selectively the first or the second circuit to the alternating current power supply port as a function of a state of the power supply of the electrical system in the installation,
    wherein each electrical system of the installation consumes direct current and is electrically connected to the alternating current power supply port through a direct current power supply device with AC/DC conversion,
    wherein the switch is commanded to connect selectively the first or the second circuit to the alternating current power supply port as a function of a state of the supply with direct current of the electrical system in the installation, and
    wherein the installation further comprises at least one module for managing the power supply of the electrical system designed to transmit an information message on the state of the direct current power supply of the electrical system to a controller of the switch, said controller being located upstream of said AC/DC conversion.

2. The electrical assembly according to claim 1, further comprising an alternating current circuit breaker arranged electrically at the output of the first and second circuits.

3. The electrical assembly according to claim 1, wherein the installation further comprises at least one additional back up device, comprising means for charging, means for storing and means for discharging electrical energy, and electrically by-pass connected between the direct current power supply device and the electrical system supplied by said power supply device with direct current, the additional back up device being designed to transmit a warning signal in situation of discharge to the management module, said warning signal participating in a definition of a state of the direct current power supply of the electrical system in the installation.

4. The electrical assembly according to claim 3, wherein the management module is connected, by means of a numerical data transmission bus, to the direct current power supply device to the additional back up device to the electrical system and to the controller so as to receive and transmit information or command data from and to said direct current power supply device, said additional back up device, said electrical system, and said controller.

5. The electrical assembly according to claim 3, wherein the electrical energy storage means of the additional back up device comprises at least one electrochemical double layer supercapacitor.

6. The electrical assembly according to claim 5, wherein the electrical energy storage means of the additional back up device comprises at least one circuit of supercapacitors arranged in series.

7. The electrical assembly according to claim 1, wherein the installation comprises a computing centre and the electrical system comprises an information processing system with at least one computer supplied with extra-low voltage of said computing centre.

8. A method of supplying without interruption an electrical supply port of an installation with alternating current comprising at least one electrical system connected to the power supply port, comprising the steps of:
    supplying the installation with alternating current by default using a first circuit which electrically connects the electrical power supply port to an alternating current power supply network;
    supplying the installation with alternating current using a back up device comprising a rectifier, means for charging, means for storing and means for discharging electrical energy, and an inverter electrically arranged between the alternating current power supply network and the power supply port of the installation in the event of malfunction of the power supply by default,
    wherein the back up device is arranged in a second alternating current power supply circuit connected to the power supply port in a by-pass of the first circuit,
    wherein the method further comprises a step of commutation by a switch between a power supply by the first or the second circuit as a function of a state of the power supply of the electrical system in the installation, each electrical system consuming direct current and being electrically connected to the power supply port through a direct current power supply device with AC/DC conversion,
    wherein the method further comprises a step of transmitting, by a management module of the installation, an information message on the state of a direct current power supply of the electrical system to a controller of the switch, said controller being located upstream of said AC/DC conversion, and wherein the state of power supply of the electrical system in the installation is the state of direct current power supply of the electrical system in the installation.

* * * * *